United States Patent
Ganesan et al.

(10) Patent No.: US 9,692,700 B1
(45) Date of Patent: Jun. 27, 2017

(54) PROCESSING DATA FLOWS BASED ON INFORMATION PROVIDED VIA BEACONS

(71) Applicant: Juniper Networks, Inc., Sunnyvale, CA (US)

(72) Inventors: Prabhakaran Ganesan, Fremont, CA (US); Sankar Ramamoorthi, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 568 days.

(21) Appl. No.: 14/012,750

(22) Filed: Aug. 28, 2013

(51) Int. Cl.
    *G06F 15/16* (2006.01)
    *H04L 12/801* (2013.01)

(52) U.S. Cl.
    CPC .................................. *H04L 47/10* (2013.01)

(58) Field of Classification Search
    CPC . H04L 47/10; H04L 63/0264; H04L 63/0236; H04W 72/042; H04W 72/1284; H04W 72/085; H04W 74/002; H04W 74/08
    USPC ........ 709/201; 370/330, 311, 252, 235, 230; 455/133, 11.1
    See application file for complete search history.

(56) References Cited

U.S. PATENT DOCUMENTS

| 7,411,902 | B2* | 8/2008 | Kumar | H04L 47/10 370/230 |
| 8,339,959 | B1* | 12/2012 | Moisand | 370/235 |
| 2005/0233715 | A1* | 10/2005 | Laroia | H04B 1/005 455/133 |
| 2006/0048220 | A1* | 3/2006 | Jahromi | H04L 51/34 726/22 |
| 2006/0104308 | A1* | 5/2006 | Pinkerton | H04L 63/0485 370/469 |
| 2007/0168760 | A1* | 7/2007 | Ko | G06F 11/0766 714/49 |
| 2011/0261817 | A1* | 10/2011 | Morris | H04L 45/00 370/392 |
| 2012/0082073 | A1* | 4/2012 | Andreasen | H04L 12/4633 370/310 |
| 2012/0213095 | A1* | 8/2012 | Krishnamurthy | H04L 5/001 370/252 |
| 2012/0264369 | A1* | 10/2012 | Wang | H04B 7/15528 455/11.1 |
| 2013/0028107 | A1* | 1/2013 | Ho | H04W 24/02 370/252 |
| 2014/0010515 | A1* | 1/2014 | Lee | H04L 65/605 386/207 |
| 2014/0071873 | A1* | 3/2014 | Wang | H04W 74/08 370/311 |

(Continued)

*Primary Examiner* — Thuong Nguyen
(74) *Attorney, Agent, or Firm* — Harrity & Harrity, LLP

(57) ABSTRACT

A first component of a network device may provide an offload request to a second component of the network device to offload a data flow from the first component. The offload request may direct the second component to provide the data flow towards a destination device and bypass the first component. The first component may receive a beacon from the second component. The beacon may identify information regarding one or more data flows offloaded from the first component. The first component may process the one or more data flows based on the information regarding the one or more data flows included in the beacon and without receiving the one or more data flows.

20 Claims, 9 Drawing Sheets

(56) References Cited

U.S. PATENT DOCUMENTS

2015/0023315 A1* 1/2015 Yerramalli .......... H04W 72/042
                                                                                                   370/330

\* cited by examiner

400

| Beacon Information 410 |||| 
|---|---|---|---|
| Data Flow ID | Status | Statistics ||
|  |  | Packets Transmitted | Bytes Received |
| 123 | Active | 100 | 25600 |
| 456 | Idle | 75 | 19200 |
| 789 | Ending | 125 | 32000 |

500

| Data Flow Information 510 | | | | |
|---|---|---|---|---|
| Data Flow ID | Status | Statistics | | |
| | | Cumulative | Received | Offloaded |
| 123 | Active | 150 packets | 50 packets | 100 packets |
| 456 | Idle | 75 packets | 25 packets | 50 packets |
| 789 | Ended | 125 packets | 10 packets | 115 packets |
| 963 | Idle | 100 packets | 50 packets | 50 packets |

PROCESSING DATA FLOWS BASED ON INFORMATION PROVIDED VIA BEACONS

BACKGROUND

Data flows are sometimes offloaded from a service plane component, of a network device, to a forwarding plane component of the network device. Messages between the service plane component and the forwarding plane component often get lost, and the service plane component and the forwarding plane component may be unable to identify which messages have been received. Control processors are sometimes used to determine whether the messages have been received or not, but may consume substantial resources and cause latency in the transmission of the data flows.

SUMMARY

According to some possible implementations, a method may include providing, by a first component of a network device, an offload request to a second component of the network device to offload a data flow from the first component. The offload request may direct the second component to provide the data flow towards a destination device and bypass the first component. The method may include receiving, by the first component, a beacon from the second component. The beacon may identify information regarding one or more data flows offloaded from the first component. The method may include processing, by the first component, the one or more data flows based on the information regarding the one or more data flows included in the beacon and without receiving the one or more data flows.

According to some possible implementations, a system may include a first component, associated with service plane of a network device, to provide an offload request to a second component of the network device to offload a data flow from the first component. The second component may be associated with a forwarding plane component of the network device. The offload request may direct the second component to provide the data flow towards a destination device and bypass the first component after the first component has received and serviced a group of packets of the data flow. The first component may receive a beacon from the second component. The beacon may identify information regarding one or more data flows offloaded from the first component. The first component may process the one or more data flows based on the information regarding the one or more data flows included in the beacon and without receiving the one or more data flows.

According to some possible implementations, a computer-readable medium for storing instructions may include multiple instructions which, when executed by a first component of a network device to, cause the first component to provide an offload request to a second component of the network device to offload a data flow from the first component. The offload request directing the second component to provide the data flow towards a destination device and bypass the first component. The multiple instructions may further cause the first component to receive a beacon from the second component. The beacon may identify information regarding one or more data flows offloaded from the first component. The multiple instructions may further cause the first component to process the one or more data flows based on the information regarding the one or more data flows included in the beacon and without receiving the one or more data flows. The first component may correspond to a service plane component and the second component may correspond to a forwarding plane component.

DETAILED DESCRIPTION

The following detailed description refers to the accompanying drawings. The same reference numbers in different drawings may identify the same or similar elements.

Systems and/or methods, as described herein, may provide a beacon to a service plane component, associated with a network device, for data flows offloaded from the service plane component to a forwarding plane component of the network device. Based on information included in the beacon, the service plane component may determine information regarding the data flow without receiving the data flow, and may process the data flow. For example, the service plane component may use the information included in the beacon to determine whether a message, associated with a data flow, has been received (e.g., a message requesting the forwarding plane component to offload a data flow, a message requesting the forwarding plane component to discontinue offloading a data flow, a message indicating that a data flow has ended, etc.). Further, based on information included in the beacon, the service plane component may determine that a data flow has ended to allow the service plane component to process the data flow that has ended.

Figure 1A:
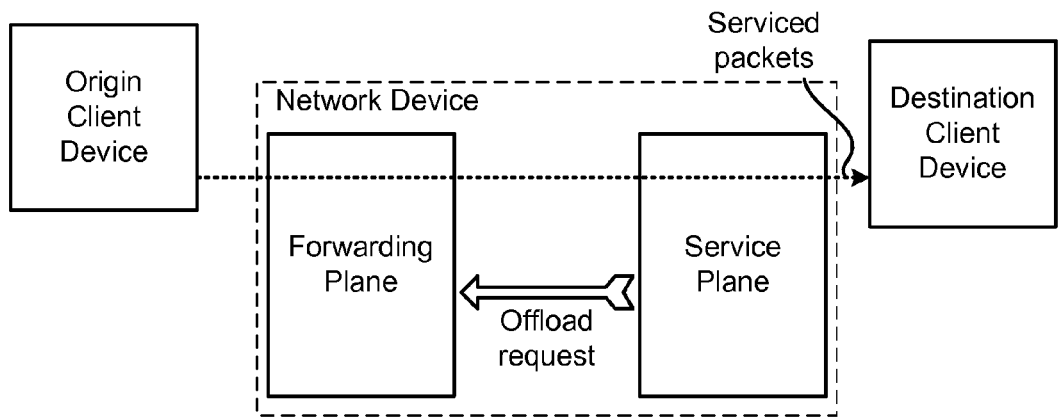
FIGS. 1A-1B illustrate an example overview of an implementation described herein.
Figure 1B:
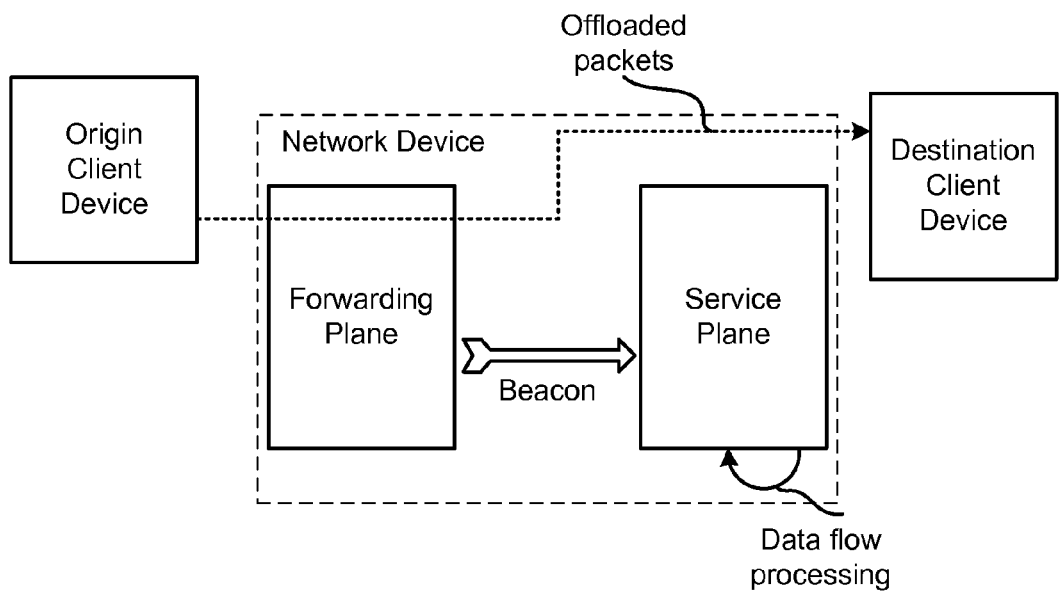

FIGS. 1A-1B illustrate an example implementation as described herein. As shown in FIG. 1A, a network device may include a forwarding plane component and a service plane component. In some implementations, the forwarding plane component may receive a data flow from an origin client device. In some implementations, the forwarding plane component may provide the data flow to a service plane component. In some implementations, the service plane component may perform a service to packets of the data flow (e.g., a firewall service, an internet protocol security (IPSEC) service, a deep-packet inspection (DPI) service, a network address translation (NAT) service, a virus scan service, and/or some other type of service to the packets of the data flow).

In some implementations, the service plane component may provide the packets (e.g., after servicing the packets), to a destination device, such as a destination client device. In some implementations, the service plane component may provide an offload request to the forwarding device to cause the forwarding plane component to bypass the service plane component when transmitting subsequent packets associated with the data flow. For example, the service plane component may need to service an initial group of packets in the data flow (e.g., to ensure that the destination client device is authorized to receive the data flow, ensure that the data flow does not include malicious content or code, ensure that the data flow is routed properly to the destination device, etc.), but may not need to service the subsequent packets in the data flow once servicing the initial group of packets. In some implementations, the service plane component may provide the offload request to the forwarding plane component such that the data flow may be offloaded from the service plane component, thereby improving the speed and/or the quality of the transmission of the data flow.

Referring to FIG. 1B, the forwarding plane component may bypass the service plane component and may provide the subsequent packets of the data flow to the destination device. Further, the forwarding plane component may provide a beacon to the service plane component. In some implementations, the beacon may include information for the data flow offloaded from the service plane component. For example, the beacon may include an identifier (ID) of the data flow, a status of the data flow (e.g., an active status, an idle status, an ended status, etc.), statistics of the data flow (e.g., a quantity of packets and/or bytes of the data flow transmitted), and/or some other information relating to the data flow.

As described above, the service plane component may determine whether a message has been received by the forwarding plane component (and may resend the message in the event that the message has not been received) and/or may determine that a data flow has ended (e.g., to process statistics associated with the ended data flow) based on information included in the beacon. For example, the service plane component may determine that an offload request has been received when the beacon includes an ID of the offloaded data flow. Further, the service plane component may determine that an offload delete instruction for a data flow (e.g., a request to discontinue offloading the data flow) has been received when the beacon does not include an ID of the data flow and when the service plane component receives the data flow after providing the offload delete instruction. As a result, reliability of the transmission of the data flow request or the offload delete instruction can be improved using information included in the beacons.

As described above, data flows may be offloaded from the service plane component to the forwarding plane component to improve the speed and/or quality of the transmission of packets associated with the data flow (e.g., when the service plane component slows the transmission of the packets when performing a service on the packets). Further, the service plane component may receive status information, statistics information, and/or some other information relating to the data flow (e.g., to determine whether a message relating to the data flow has been received by the forwarding plane component and/or to process information for a data flow that has ended) even when the service plane component does not directly receive the data flow. In some implementations, the forwarding plane component may periodically provide beacons such that the service plane component receives up to date information regarding a data flow. Further, offload requests and offload delete instructions can be re-transmitted when the service plane component determines that the offload request or the offload delete instruction has not been received by the forwarding plane component, thereby increasing the speed and/or efficiency at which an offload request or an offload delete instruction is processed.

Figure 2:
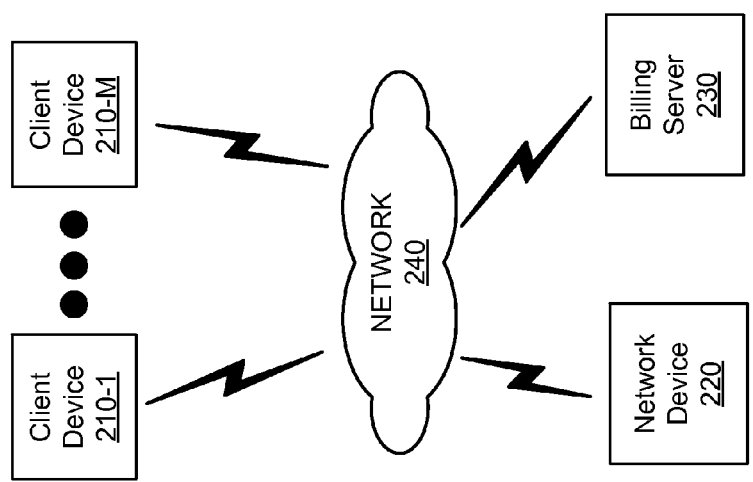
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include client devices 210-1, . . . , 210-M (where M≥1), network device 220, billing server 230, and network 240.

Client device 210 may include a device capable of communicating via a network, such as network 240. For example, client device 210 may correspond to a mobile communication device (e.g., a smart phone or a personal digital assistant (PDA)), a portable computer device (e.g., a laptop or a tablet computer), a gaming device, a set-top box, a desktop computing device, a server device, a content storage device, a client network device (e.g., a router, a switch, a hub, an access point, a base station, etc.), and/or some other type of device capable of communicating via network 240. In some implementations, client device 210 may communicate via network device 220 to transmit and/or receive data packets for a data flow.

Network device 220 may include a network routing device or a collection of network routing devices. In some implementations, network device 220 may include a router, a switch, a gateway, an access point, or some other type of network device. In some implementations, network device 220 may receive data flows, and may process data flows in accordance with parameters specified in a routing table implemented by network device 220. In some implementations, the routing table may correspond to a routing information base (RIB) or some other type of routing table.

In some implementations, network device 220 may include a forwarding plane component, a service plane component, and/or some other type of component. In some implementations, the forwarding plane component may receive a data flow from an origin device destined for a destination device. In some implementations, the forwarding plane component may provide the data flow to the service plane component. In some implementations, the service plane component may receive the data flow, and perform a service on one or more packets of the data flow to form serviced packets. In some implementations, the service plane component may service an initial group of the packets in the data flow to ensure proper routing and transmission of the packets and/or authenticate the destination device to receive the packets. Additionally, or alternatively, the service plane component may service the initial group of packets for some other purpose, such as identify malicious content or code. In some implementations, the service plane component may provide the serviced packets towards the destination device.

In some implementations, the service plane component may provide an offload request to the forwarding plane component to cause the forwarding plane component to provide the data packets, associated with the data flow, towards the destination device and to bypass the service plane component. In some implementations, the forwarding plane component may provide a beacon, having information regarding data flows that have been offloaded, to the service plane component. In some implementations, communications between the service plane component and the forwarding plane component may be made using datagram protocol (UDP) packets, or the like, and may be formed by one or more data-cores and processed by a custom microcode.

Billing server 230 may include a computing device, such as a server device, or a collection of server devices. In some implementations, billing server 230 may receive information from network device 220 regarding network usage by client device 210. For example, billing server 230 may receive information identifying a quantity of data (e.g., a quantity of packets, a quantity of bits, bytes, kilobytes, megabytes, etc.), transmitted to and/or from client device 210 via network device 220. In some implementations, billing server 230 may store account related information associated with client device 210 and may charge an account of client device 210 based on network usage data received from network device 220.

Network 240 may include one or more wired and/or wireless networks. For example, network 240 may include a cellular network (e.g., a second generation (2G) network, a third generation (3G) network, a fourth generation (4G) network, a fifth generation (5G) network), a public land mobile network (PLMN), and/or another network. Additionally, or alternatively, network 240 may include a local area network (LAN), a wide area network (WAN), a metropolitan network (MAN), a telephone network (e.g., the Public Switched Telephone Network (PSTN)), an ad hoc network, a managed IP network, a virtual private network (VPN), an intranet, the Internet, a fiber optic-based network, and/or a combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3A:
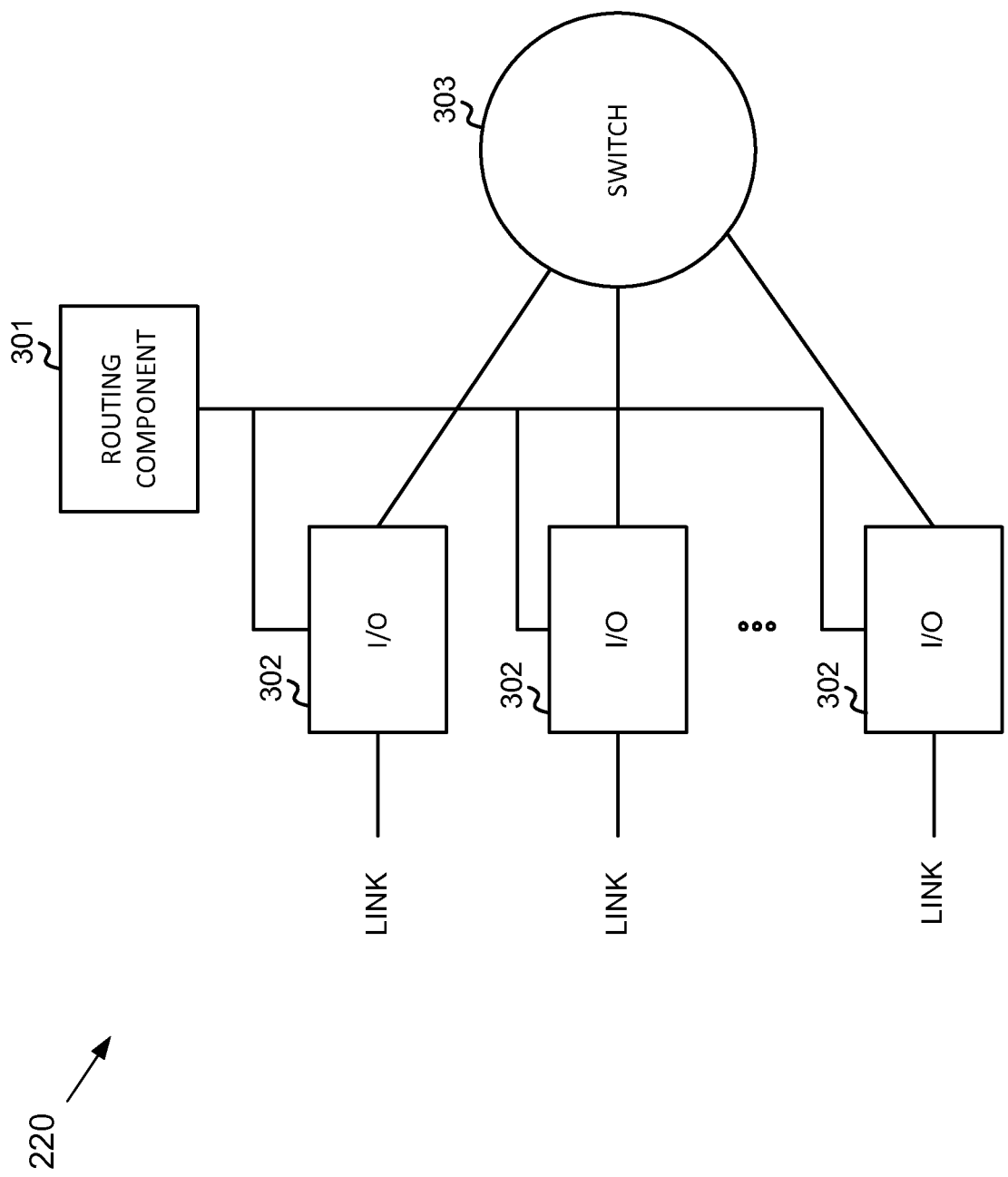
FIG. 3A illustrates example components of a network device.

FIG. 3A illustrates example components of network device 220. As shown in FIG. 3A, network device 220 may include routing component 301, input/output (I/O) components 302, and switch 303.

Routing component 301 may include a routing processor or a collection of routing processors. In some implementations, routing component 301 may perform a high level management function for network device 220. For example, routing component 301 may communicate with networks and/or systems connected to network device 220 to exchange information regarding network topology. In some implementations, routing component 301 may generate routing tables based on network topology information, may generate forwarding tables based on the routing tables, and may send the forwarding tables to I/O components 302. In some implementations, routing component 310 may perform other general control and monitoring functions for network device 220.

I/O component 302 may include an interface device or a collection of interface devices. In some implementations, I/O component 302 may connect to routing component 301 and switch 303. In some implementations, I/O component 302 may receive packets on physical links connected to a network. Each physical link could be one of many types of transport media, such as optical fiber or Ethernet cable. The packets on the physical link may be formatted according to one of several protocols, such as the synchronous optical network (SONET) standard or Ethernet. In some implementations, I/O component 302 may use forwarding tables to perform route lookup for incoming data flows.

Switch 303 may include one or more switching planes to facilitate communication between two or more of I/O components 302. In some implementations, switch 303 may include a single or multi-stage switch fabric.

Figure 3B:
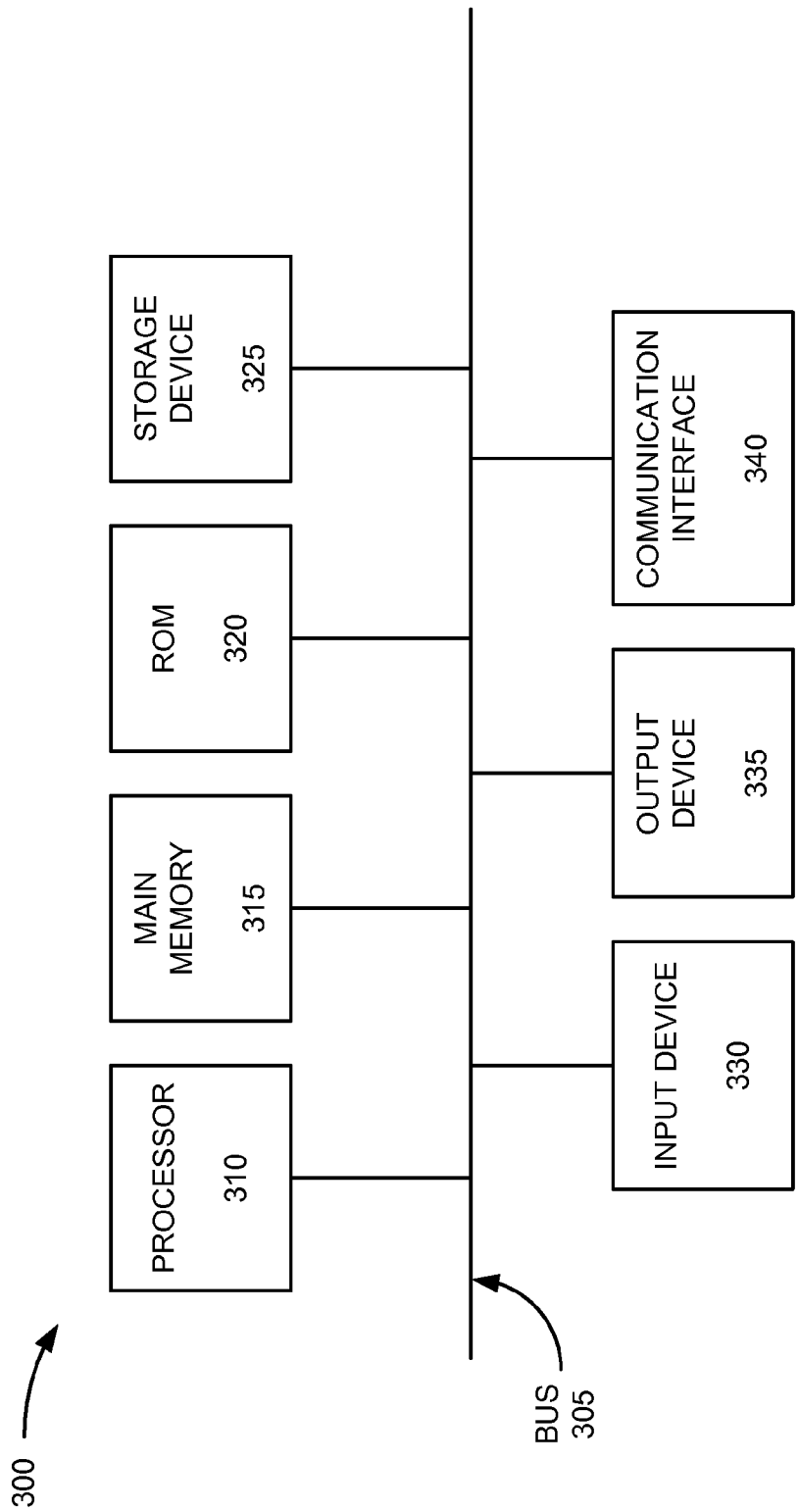
FIG. 3B illustrates example components of a device that may be used within the environment of FIG. 2.

In some implementations, network device 220 may include additional components, fewer components, different components, or differently arranged components than are shown in FIG. 3B.

FIG. 3B illustrates example components of a device 300 that may be used within environment 200 of FIG. 2. Device 300 may correspond to client device 210 and/or billing server 230. Each of client device 210 and/or billing server 230 may include one or more devices 300 and/or one or more components of device 300. Similarly, network device 220 may include one or more devices 300 and/or one or more components of device 300.

As shown in FIG. 3B, device 300 may include a bus 305, a processor 310, a main memory 315, a read only memory (ROM) 320, a storage device 325, an input device 330, an output device 335, and a communication interface 340.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device. Output device 335 may include a component that outputs information to the operator, such as a light emitting diode (LED), a display, or another type of output device. Communication interface 340 may include any transceiver-like component that enables device 300 to communicate with other devices or networks. In some implementations, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

In some implementations, device 300 may include additional components, fewer components, different components, or differently arranged components than are shown in FIG. 3B.

Figure 4:
FIG. 4 illustrates an example data structure that may be stored by one or more devices in the environment of FIG. 2.

FIG. 4 illustrates an example data structure 400 that may be stored by one or more devices in environment 200, such as network device 220. In some implementations, data structure 400 may be stored in a memory of network device 220. In some implementations, data structure 400 may be stored in a memory separate from, but accessible by, network device 220. In some implementations, data structure 400 may be stored by some other device in environment 200, such as client device 210 and/or billing server 230.

A particular instance of data structure 400 may contain different information and/or fields than another instance of data structure 400. In some implementations, data structure 400 may correspond to information included in a beacon provided by a forwarding plane component to a service plane component of network device 220. Another instance of data structure 400 may correspond to information included in another beacon provided by the forwarding plane component.

As shown in FIG. 4, data structure 400 may include beacon information field 410.

Beacon information field 410 may identify status and statistics for one or more offloaded data flows (e.g., data flows that the forwarding plane component provides towards a destination device while bypassing the service plane component). In some implementations, beacon information field 410 may store an identifier of a data flow (e.g., a data flow ID), a status of the data flow, and statistics regarding the data flow. In some implementations, the data flow ID may include a string of characters of any format and length to uniquely identify the data flow (e.g., an origin and/or destination, associated with the data flow, and/or some other information regarding the data flow). In some implementations, the status of the data flow may include an "active" status (e.g., when the data flow is actively being transmitted), an "idle" status (e.g., when the transmission of the data flow has stopped, but has not timed out with respect to a particular time-out period), an "ending" status (e.g., when the transmission of the data flow is ending, such as when a final packet of the data flow, such as a "fin-bit" has been transmitted), and/or some other status. In some implementations, statistics of the data flow may identify a quantity of packets of the data flow transmitted which may correspond to a quantity of bytes of the data flow received for transmission (e.g., 256 bytes per packet or some other quantity of bytes per packet). Additionally, or alternatively, beacon information field 410 may include some other information regarding the statistics of a data flow.

In some implementations, information stored by beacon information field 410 may correspond to a portion of a forwarding table formed by the forwarding plane component (e.g., a table that identifies that status of data flows, origin devices associated with the data flows, destination devices that are to receive the data flows, services that the data flows may receive, and/or some other information regarding the data flows). For example, beacon information field 410 may store the identifiers, statuses, and statistics of those data flows, stored by the forwarding table, that have been offloaded. In some implementations, the statistics of a data flow, stored by beacon information field 410, may identify a quantity of packets transmitted and/or a quantity of bytes transmitted since the data flow has been offloaded.

As an example, assume that the forwarding plane component receives an offload request for the data flow having the data flow ID "123." Further, assume that the data flow is currently active and that 100 packets have been transmitted since the data flow has been offloaded (e.g., corresponding to 25,600 bytes received). Given these assumptions, beacon information field 410 may store information to identify that the data flow having the ID "123" is "active," and that 100 packets have been transmitted (corresponding to 25,600 bytes received for transmission).

As described above, the forwarding plane component may periodically provide beacons to the service plane component. For example, the forwarding plane component may provide a first beacon that identifies the status and statistics of a data flow. Further, the forwarding plane component may later provide a second beacon that identifies an updated status and updated statistics for the data flow. As described in greater detail below, the service plane component may identify cumulative statistics for a data flow (e.g., a cumulative quantity of packets and/or bytes transmitted for the data flow between the service plane component and the forwarding plane component).

While particular fields are shown in a particular format in data structure 400, in practice, data structure 400 may include additional fields, fewer fields, different fields, or differently arranged fields than are shown in FIG. 4. Also, FIG. 4 illustrates examples of information stored by data structure 400. In practice, other examples of information stored by data structure 400 are possible.

Figure 5:
FIG. 5 illustrates an example data structure that may be stored by one or more devices in the environment of FIG. 2.

FIG. 5 illustrates an example data structure 500 that may be stored by one or more devices in environment 200, such as network device 220. In some implementations, data structure 500 may be stored in a memory of network device 220. In some implementations, data structure 500 may be stored in a memory separate from, but accessible by, network device 220. In some implementations, data structure 500 may be stored by some other device in environment 200, such as client device 210 and/or billing server 230.

A particular instance of data structure 500 may contain different information and/or fields than another instance of data structure 500. In some implementations, data flow information field 510 may be stored by the service plane component of network device 220.

As shown in FIG. 5, data structure 500 may include data flow information field 510.

Data flow information field 510 may store an identifier of a data flow (e.g., a data flow ID), a status of the data flow and cumulative statistics regarding the data flow. For example, data flow information field 510 may store information identifying a quantity of packets and/or bytes received and serviced by the service plane component (e.g., packets and/or bytes transmitted by the service plane component), information identifying a quantity of packets and/or bytes offloaded from the service plane component (e.g., packets and/or bytes transmitted by the forwarding plane component and bypassing the service plane component), and/or information identifying a cumulative quantity of packets and/or bytes of the data flow transmitted (e.g., the sum of the packets and/or bytes transmitted by the service plane component and the forwarding plane component). In some implementations, the information identifying the quantity of packets and/or bytes offloaded from the service plane component may correspond to statistics information included in beacon information field 410.

In some implementations, data flow information field 510 may store information regarding the status of the data flow (e.g., an "active" status, an "idle" status, an "ended" status, etc.). In some implementations, data flow information field 510 may store an "active" status for a data flow when the service plane component is currently transmitting the data flow. Additionally, or alternatively, data flow information field 510 may store an "active" status when the data flow is offloaded and when beacon information field 410 stores an "active status."

In some implementations, data flow information field 510 may store an "idle" status when beacon information field 410 stores an "idle" status for a data flow that has been offloaded. Alternatively, data flow information field 510 may store an "idle" status when beacon information field 410 does not include information regarding the data flow. For example, beacon information field 410 may not include information regarding the data flow when the forwarding plane component deletes the data flow from a forwarding table (e.g., when the data flow times out with respect to a time-out period). In some implementations, the forwarding plane component may delete the data flow from the forwarding table (and from beacon information field 410) after the data flow times out with respect to a first time-out period (e.g., to make resources available for active data flows). In some implementations, the service plane component may maintain the "idle" status until the data flow times out with respect to a second time-out period that is longer than the first time-out period (e.g., to prevent the data flow from being prematurely ended by the service plane component).

In some implementations, data flow information field 510 may store an "ended" status when the service plane component determines that a data flow has ended (e.g., when the service plane component receives a "finbit" from the forwarding plane component, when the data flow has timed out with respect to a time-out period, when the data flow has been offloaded but a beacon having information regarding the data flow has not been received for a particular amount of time corresponding to the time-out period, or the like). Additional details regarding determining that a data flow has ended are described with respect to FIG. 6.

While particular fields are shown in a particular format in data structure 500, in practice, data structure 500 may include additional fields, fewer fields, different fields, or differently arranged fields than are shown in FIG. 5. Also, FIG. 5 illustrates examples of information stored by data structure 500. In practice, other examples of information stored by data structure 500 are possible.

Figure 6:
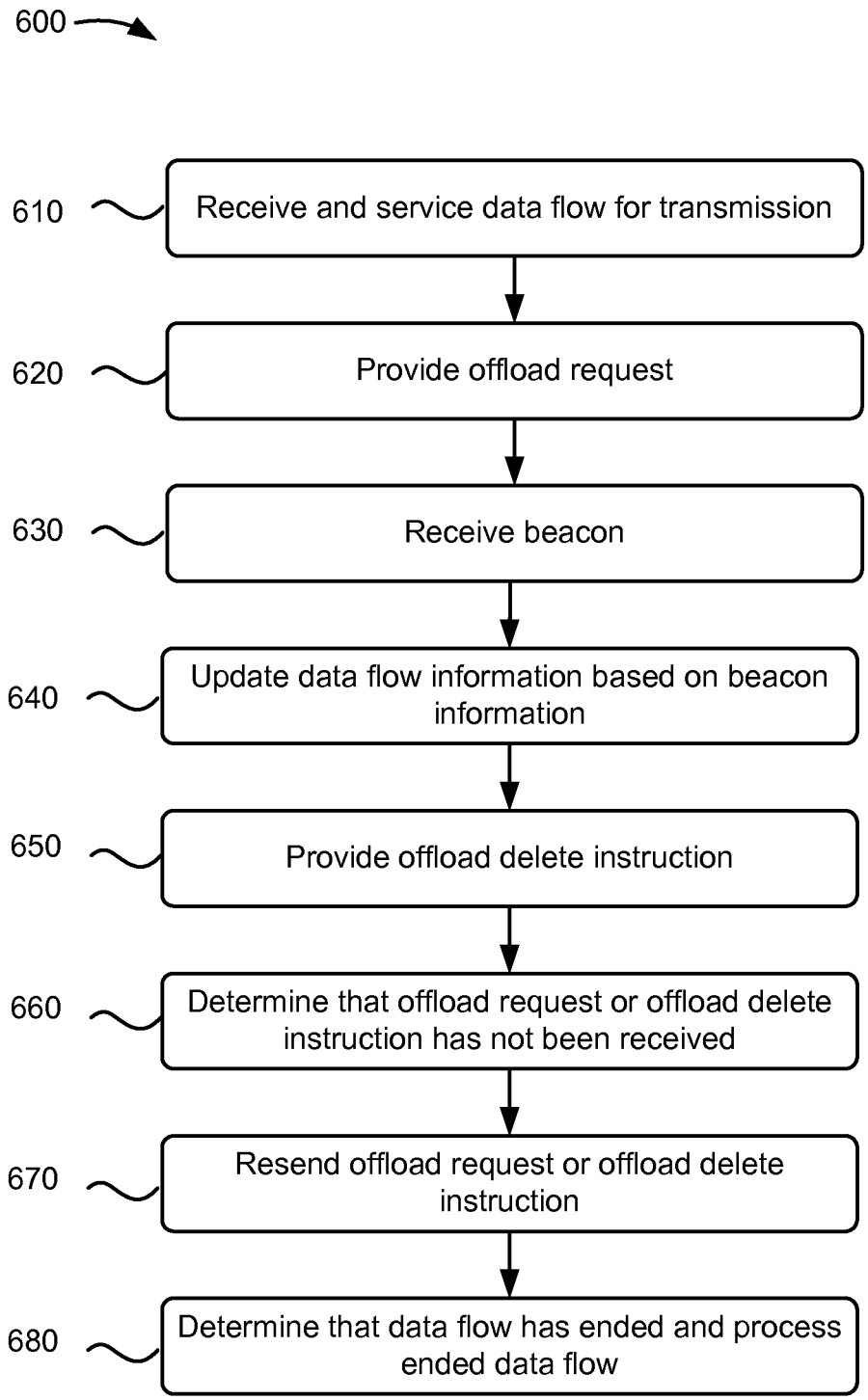
FIG. 6 illustrates a flowchart of an example process for determining information regarding a data flow using beacons.

FIG. 6 illustrates a flowchart of an example process 600 for determining information regarding a data flow using beacons. In some implementations, process 600 may be performed by one or more components of network device 220. In some implementations, some or all of blocks of process 600 may be performed by one or more components of another device in environment 200 (e.g., client device 210 and/or billing server 230), or a group of devices including or excluding network device 220.

As shown in FIG. 6, process 600 may include receiving and servicing a data flow for transmission (block 610). For example, a service plane component of network device 220 may receive the data flow from a forwarding plane component of network device 220 (e.g., a data flow from an origin client device 210 (e.g., client device 210-1) destined for a destination client device 210 (e.g., client device 210-2)). In some implementations, the service plane component may service an initial group of packets, associated with the data flow, and provide the serviced packets towards client device 210-2. For example, the service plane component may provide the initial group of packets with a firewall service, an IPSEC service, a DPI service, a NAT service, a virus scan service, and/or some other type of service to the initial packets of the data flow to form the serviced packets.

Process 600 may also include providing an offload request (block 620). For example, the service plane component may determine that subsequent packets of the data flow may not need to be serviced and that the data flow may be offloaded (e.g., to improve transmission speeds of the data flow when the data flow is offloaded). In some implementations, the service plane component may provide the offload request to the forwarding plane component to direct the forwarding plane component to bypass the service plane component and to provide the data flow towards client device 210-2.

Process 600 may further include receiving a beacon (block 630). For example, the service plane component may receive a beacon from the forwarding plane component based on the forwarding plane component receiving an offload request. In some implementations, the service plane component may receive the beacon from the forwarding plane component at regular intervals (e.g., every 5 seconds, 10 seconds, 15 seconds, 30 seconds, and/or some other interval). As described above, the beacon may include a portion of a forwarding table maintained by the forwarding plane component. For example, the beacon may include IDs of data flows that have been offloaded, the status of the data flows, and statistics of the data flows. That is, the beacon may include the ID, status, and/or statistics of the data flow corresponding to the offload request in addition to the ID, status, and/or statistics of other data flows that are currently being offloaded.

Process 600 may also include updating data flow information based on beacon information (block 640). For example, the service plane component may update the data flow information stored by data flow information field 510 based on information included in the beacon. As described above with respect to data flow information field 510, the service plane component may store the status and the cumulative statistics of the data flow (e.g., a quantity of packets and/or bytes of the data flow transmitted by the service plane component (non-offloaded packets) and the forwarding plane component (offloaded packets)). In some implementations, the service plane component may update the data flow information each time a beacon is received.

Process 600 may further include providing an offload delete instruction (block 650). For example, the service plane component may provide an offload delete instruction to direct the forwarding plane component to discontinue offloading the data flow. In some implementations, the service plane component may provide the offload delete instruction to make resources available for the forwarding plane component to offload data flows having higher than a threshold average bitrate transmission speed. For example, the forwarding plane component may have a limited quantity of offloading slots that may be used to offload data flows. In some implementations, the service plane component may reserve the slots for those data flows that are being transmitted at higher than a threshold average bitrate. Thus, the service plane component may provide the offload delete instruction when the average bitrate of the data flow drops below the threshold. Additionally, or alternatively, the service plane component may provide the offload delete instruction to make an offload slot available for a data flow whose priority level exceeds a threshold level in favor of a data flow whose priority level does not exceed the threshold level. Additionally, or alternatively, the service plane component may provide the offload delete instruction in order to re-establish a service for the data flow. Additionally, or alternatively, the service plane component may provide the offload delete instruction for some other purpose.

Process 600 may also include determining that the offload request or the offload delete instruction has not been received (block 660). For example, the service plane component may determine that the offload request has not been received by the forwarding plane component when a particular quantity of beacons, received by the service plane component after providing the offload request, do not include an ID of the data flow that is to be offloaded. Additionally, or alternatively, the service plane component may determine that the offload request has not been received by the forwarding plane component when a beacon that includes the ID of the data flow is not received after a particular threshold amount of time. For example, assume that the forwarding plane component provides beacons every 30 seconds. In some implementations, the service plane component may determine that the offload request has not been received by the forwarding plane component when the next three beacons, received by the service plane component after providing the offload request, do not include the ID of the data flow, or when the service plane component does not receive a beacon having the ID of the data flow within 90 seconds of providing the offload request.

In some implementations, the particular amount of time and/or the particular quantity of beacons that do not include the ID of the data flow may be selected to compensate for beacons that may be provided by the forwarding plane component, but not received by the service plane component (e.g., lost beacons). For example, the service plane component may determine that the offload request has not been received by the forwarding plane component after the particular number of beacons that do not include the ID of the data flow have been received and/or after a particular amount of time has passed without receiving a beacon having the ID of the data flow.

Additionally, or alternatively, the service plane component may determine that the offload request has not been received when the service plane component continues to receive the data flow. As described in greater detail below (e.g., when the ID of the data flow is not included in the particular quantity of beacons and when the data flow is not received by the service plane component), the service plane component may determine that the data flow has ended.

In some implementations, the service plane component may determine that the offload delete instruction has not been received when a particular quantity of beacons, received by the service plane component after providing the offload delete instruction, include the ID of the data flow associated with the offload delete instruction (thereby indicating that the data flow is still being offloading) and/or when the service plane component does not receive the data flow. As described in greater detail below (e.g., when the ID of the data flow is not included in the particular quantity of beacons and when the data flow is not received by the service plane component), the service plane component may determine that the data flow has ended.

Process 600 may further include resending the offload request or the offload delete instruction (block 670). For example, the service plane component may resend the offload request based on determining that the offload request has not been received. In some implementations, the service plane component may not resend the offload request (e.g., when a priority level of the data flow is below a particular threshold, when an average transmission bit rate of the data flow over a particular time period is below a particular threshold, or based on some other factor).

In some implementations, the service plane component may determine the transmission bit rate of a data flow based on statistics information included in beacons received by the service plane component. For example, assume that the service plane component receives five beacons over five seconds (e.g., beacon 1, beacon 2, beacon 3, beacon 4, and beacon 5). Further, assume that beacons 1 identifies 5 transmission statistics for a particular data flow (e.g., 123). For example, assume that beacon 1 identifies 5 megabits transmitted, beacon 2 identifies 5 megabits transmitted, beacon 3 identifies 5 megabits transmitted, beacon 4 identifies 3 megabits transmitted, and beacon 5 identifies 2 megabits transmitted. Given these assumptions, the service plane component may determine that the average transmission bit rate for data flow 123 was four megabits per second over the last five seconds (e.g., (5+5+5+3+2)/5=4). As described above, the service plane component may provide an offload delete instruction when the average bit rate over a particular time period drops below a particular threshold.

In some implementations, the service plane component may resend the offload delete instruction based on determining that the offload delete instruction has not been received. In some implementations, the offload delete instruction may be resent a particular number of times to increase the likelihood of successful receipt by the forwarding plane component. In some implementations, the service plane component may continue to receive beacons and may determine whether the offload delete instruction has been received based on information included in the beacons and may continue to resend the offload delete instruction until the offload delete instruction has been received (e.g., when the service plane component begins receiving the data flow after providing the offload delete) or the data flow has ended.

Process 600 may also include determining that the data flow has ended and processing the ended data flow (block 680). For example, the service plane component may determine that the data flow has ended when the service plane component does not receive the data flow after a particular amount of time, and when a beacon having the ID of the data flow has not been received after a particular amount of time. Additionally, or alternatively, the service plane component may determine that a data flow has ended when a beacon identifies an "ending" status for a data flow (e.g., corresponding to a "finbit" that identifies that the data flow is to end after the transmission of the "finbit"). Additionally, or alternatively, the service plane may determine that a data flow has ended when receiving an indication from the forwarding plane component that the data flow has ended. In some implementations, the service plane component may not receive the indication from the forwarding plane component that the data flow has ended, and may use the information from the beacons to determine that the data flow has ended (e.g., when a beacon having the ID of the data flow has not been received after a particular amount of time).

In some implementations, the service plane component may process the data flow by updating the status of the data flow in data flow information field 510 to the "ended" status. In some implementations, the service plane component may determine a cumulative quantity of packets and/or bytes of the data flow transmitted (both directly by the service plane component and by the forwarding plane component) and may provide the ID of the data flow and the cumulative quantity of packets and/or bytes to billing server 230. In some implementations, billing server 230 may assess the quantity of packets and/or bytes to an account associated with the ID of the data flow. In some implementations, billing server 230 may assess a charge corresponding to the quantity of packets and/or bytes.

While FIG. 6 shows process 600 as including a particular quantity and arrangement of blocks, in some implementations, process 600 may include fewer blocks, additional blocks, or a different arrangement of blocks. For example, block 630 may be periodically repeated throughout process 600 such that the service plane component may continuously receive updated status and statistics for offloaded data flows and such that the service plane component may determine, at any given time, whether an offload request or an offload delete instruction has been received by the forwarding plane component or whether a data flow has ended based on information included in beacons. Also, blocks 660-670 may be omitted when the service plane component determines that an offload request and/or an offload delete instruction has been received.

Figure 7A:
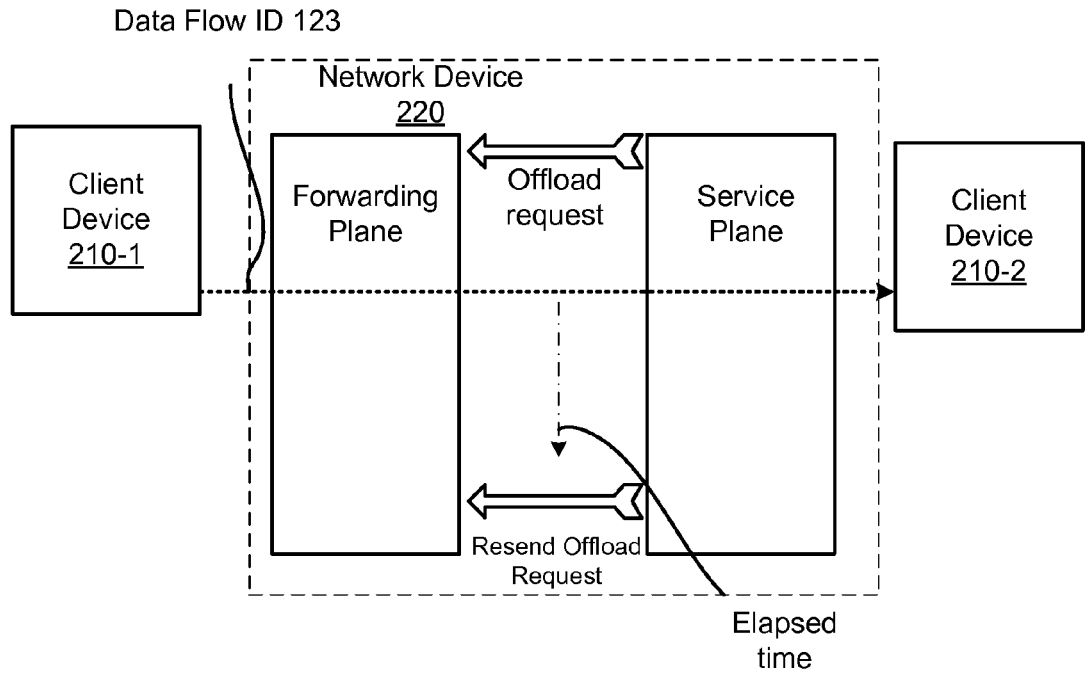
FIGS. 7A-7C illustrates an example implementation as described herein.
Figure 7B:
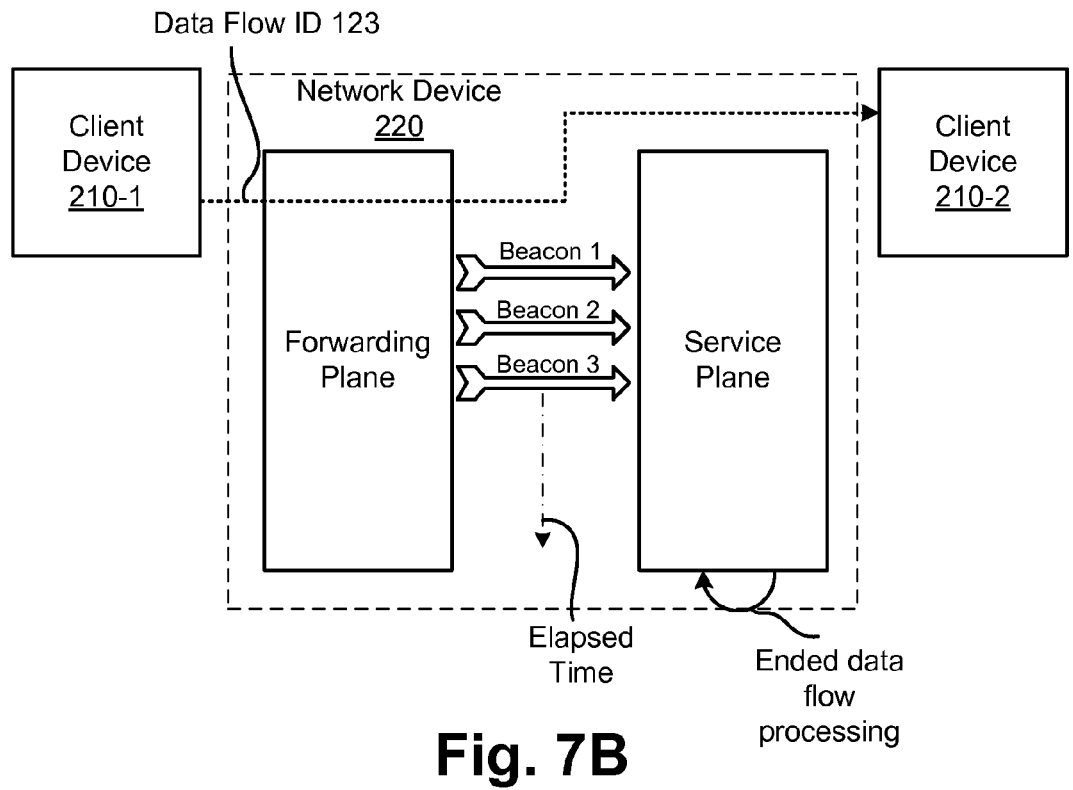
Figure 7C:
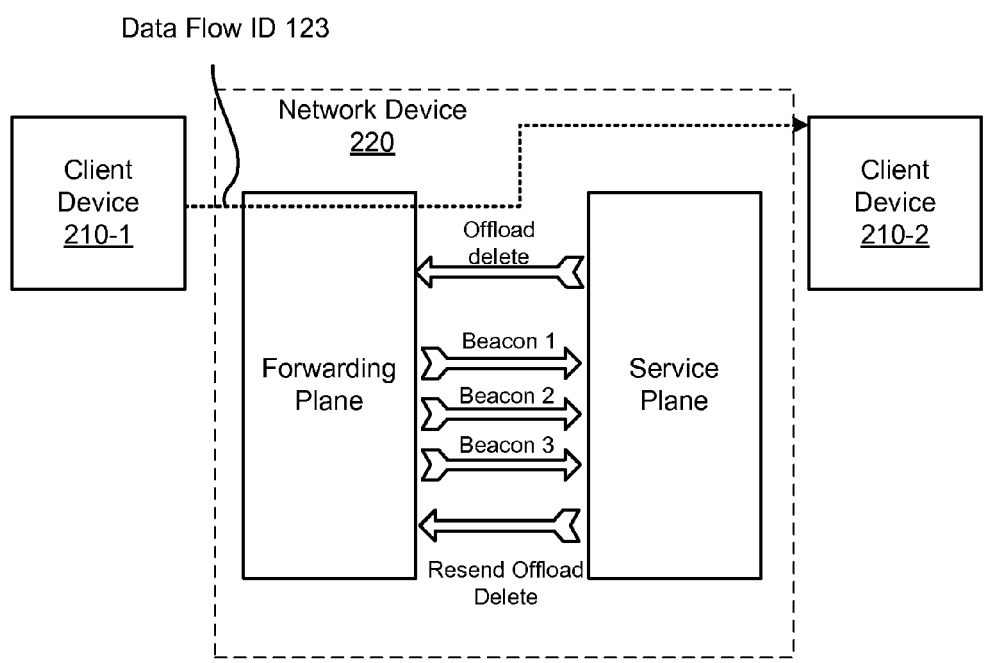

FIGS. 7A-7C illustrate example implementations as described herein. In FIG. 7A, assume that a service plane component of network device 220 receives an initial group of packets of a data flow having the ID 123 (data flow 123). Further, assume that the service plane component provides an offload request to the forwarding plane component after receiving the initial group of packets. Further, assume that after a particular threshold amount of time has elapsed and/or after a particular number of beacons have been received, the service plane component continues to receive subsequent packets of data flow 123 and that a beacon having information regarding data flow 123 has not been received. Given these assumptions, the service plane component may determine that the offload request has not been received and may resend the offload request to the forwarding plane component.

Referring to FIG. 7B, assume that the service plane component provides an offload request for the data flow having the ID 123 and that the service plane component does not receive data flow 123 after providing the offload request. In some implementations, the service plane component may not receive the data flow when the offload request has been received and when the forwarding plane component bypasses the service plane component. Alternatively, the service plane component may not receive the data flow when the data flow has ended. In some implementations, the service plane component may determine, based on information included in beacons provided by the forwarding plane component to the service plane component, whether the data flow has ended or whether the data flow is being bypassed. For example, assume that the service plane component receives beacon 1, beacon 2, and beacon 3 at periodic intervals. Further, assume that beacon 1, beacon 2, and beacon 3 identify data flow ID 123, a status of data flow 123, and/or statistics of data flow 123. Given these assumptions, the service plane component may determine that data flow 123 is being offloaded at times in which the service plane component receives beacon 1, beacon 2, and beacon 3 and may update the status and statistics of data flow 123 in data flow information field 510 based on information included in beacon 1, beacon 2, and beacon 3.

Continuing with the above example, assume that after receiving beacon 3, the service plane component does not receive a beacon identifying data flow 123 for a particular threshold amount of time and that the service plane component does not directly receive data flow 123. Given these assumptions, the service plane component may determine that data flow 123 has ended and may process data flow 123 (e.g., providing cumulative statistics regarding the quantity of packets and/or bytes transmitted to billing server 230, and/or performing some other type of processing to close or remove data flow 123 from a service plane table maintained by the service plane component). Additionally, or alternatively, the service plane component may determine that data flow 123 has ended when receiving an indication (e.g., a "data flow end" message) from the forwarding plane component that data flow 123 has ended. That is, the service plane component may determine that data flow 123 has ended even when the data flow end message has not been received by the service plane component (e.g., when a beacon identifying data flow 123 has not been received after a particular amount of time).

Referring to FIG. 7C, assume that data flow 123 is currently being offloaded and that the service plane component provides an offload delete instruction to direct the forwarding plane component to discontinue offloading data flow 123. Further, assume that the service plane component does not receive data flow 123 after providing the offload delete instruction. In some implementations, the service plane component may determine whether data flow 123 is not being received either because data flow 123 has ended or because the forwarding plane component has not received the offload delete instruction. For example, assume that the service plane component receives beacon 1, beacon 2, and beacon 3 after providing the offload delete instruction and that beacon 1, beacon 2, and beacon 3 include information regarding data flow 123. Given these assumptions, the service plane component may determine that the forwarding plane component has not received the offload delete instruction (e.g., since the forwarding plane component is continuing to offload data flow 123 as indicated by information in beacon 1, beacon 2, and beacon 3). Further, the service plane component may resend the offload delete instruction based on determining that the offload delete instruction has not been received.

In some implementations, the service plane component may determine that the offload delete instruction has not been received after receiving some other number of beacons that identify information regarding data flow 123. In some implementations, the service plane component may determine that data flow 123 has ended when the service plane component does not receive data flow 123 and when beacons identifying information regarding data flow 123 are not received after a particular threshold amount of time.

While particular examples are shown in FIGS. 7A-7C, the above description is merely an example implementation. In practice, other examples are possible from what is described above in FIGS. 7A-7C.

As described above, data flows may be offloaded from the service plane component to the forwarding plane component to improve the speed and/or quality of the transmission of packets associated with the data flow (e.g., when the service plane component slows the transmission of the packets when performing a service on the packets). Further, the service plane component may receive status information, statistics information, and/or some other information relating to the data flow (e.g., to determine whether a request/instruction relating to the data flow has been received by the forwarding plane component and/or to process information for a data flow that has ended) even when the service plane component does not directly receive the data flow. In some implementations, the forwarding plane component may periodically provide beacons such that the service plane component receives up to date information regarding a data flow.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Some implementations are described herein in conjunction with thresholds. The term "greater than" (or similar terms), as used herein to describe a relationship of a value to a threshold, may be used interchangeably with the term "greater than or equal" (or similar terms). Similarly, the term "less than" (or similar terms), as used herein to describe a relationship of a value to a threshold, may be used interchangeably with the term "less than or equal to" (or similar terms). As used herein. "satisfying" a threshold (or similar terms) may be used interchangeably with "being greater than a threshold," "being greater than or equal to a threshold," "being less than a threshold," "being less than or equal to a threshold," or other similar terms, depending on the context in which the threshold is used.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   receiving, by a first component of a network device, an initial group of packets associated with a data flow;
   performing, by the first component, a service on the initial group of packets;
   determining, by the first component, that subsequent group of packets of the data flow does not need to be serviced based on a result of performing the service on the initial group of packets;
   providing, by the first component, an offload request to a second component of the network device to offload the subsequent group of packets of the data flow from the first component,
      the first component corresponding to a service plane component and the second component corresponding to a forwarding plane component, and
      the offload request directing the second component to:
         provide the subsequent group of packets of the data flow towards a destination device, and
         bypass the first component;
   receiving, by the first component, a beacon from the second component,
      the beacon including information regarding one or more offloaded data flows,
         the information regarding the one or more offloaded data flows including at least one of:
            identifiers of the one or more offloaded data flows,
            a status of the one or more offloaded data flows, or
            statistics of the one or more offloaded data flows;
   updating, by the first component and without receiving the one or more offloaded data flows, data flow information regarding the data flow based on receiving the beacon,
      the data flow information being updated with:
         the information regarding the one or more offloaded data flows, and
         information regarding one or more non-offloaded data flows;
   providing, by the first component, an offload delete instruction to discontinue offloading the data flow;
   determining, by the first component, that the offload request or the offload delete instruction has not been received by the second component;
   resending, by the first component, the offload request or the offload delete instruction based on determining that the offload request or the offload delete instruction has not been received; and
   determining, by the first component, that the data flow has ended based on the data flow and a beacon not being received after a particular amount of time.

2. The method of claim 1, further comprising:
   determining a cumulative quantity of packets or bytes of the data flow transmitted by the first component and the second component based on determining that the data flow has ended; and
   providing information identifying the cumulative quantity of packets or bytes to a billing server to cause the billing server to assess a charge based on the determining the cumulative quantity of packets or bytes.

3. The method of claim 1, where updating the data flow information comprises:
   updating statistics of the data flow,
      the statistics identifying a cumulative quantity of packets or bytes of the data flow.

4. The method of claim 1, where determining that the offload request has not been received comprises:
   determining that the offload request has not been received by the second component based on the beacon not including information identifying the data flow and based on the first component receiving the data flow after providing the offload request.

5. The method of claim 1, where determining that the offload delete instruction has not been received comprises:
   determining that the offload delete instruction has not been received based on the beacon including information identifying the data flow and based on the first component not receiving the data flow after providing the offload delete instruction.

6. The method of claim 1, where providing the offload delete instruction is based on a bit rate of the data flow satisfying a particular threshold,
   the bit rate of the data flow being identified by information included in the beacon.

7. The method of claim 1, further comprising:
   providing the initial group of packets towards the destination device after servicing the initial group of packets.

8. The method of claim 1, where determining that the offload request has not been received comprises:
   determining that the offload request has not been received by the second component based on a beacon not being received after a particular amount of time.

9. A system comprising:
a first component, at least partially implemented in hardware and corresponding to a service plane of a network device, to:
   receive initial group of packets associated with a data flow;
   perform a service on the initial group of packets;
   determine that subsequent group of packets of the data flow does not need to be serviced based on a result of performing the service on the initial group of packets;
   provide an offload request to a second component of the network device to offload the data flow from the first component,
      the second component corresponding to a forwarding plane component of the network device, and
      the offload request directing the second component to:
         provide subsequent packets of the data flow towards a destination device, and
         bypass the first component after the first component has received and performed the service on the initial group of packets;
   receive a beacon from the second component,
      the beacon including information regarding one or more offloaded data flows,
         the information regarding the one or more offloaded data flows including at least one of:
         identifiers of the one or more offloaded data flows,
         a status of the one or more offloaded data flows, or
         statistics of the one or more offloaded data flows;
   update data flow information regarding the data flow, without receiving the one or more offloaded data flows, based on receiving the beacon,
      the data flow information being updated with:
         the information regarding the one or more offloaded data flows, and
         information regarding one or more non-offloaded data flows;
   provide an offload delete instruction to discontinue offloading the data flow;
   determine that the offload request or the offload delete instruction has not been received by the second component;
   resend the offload request or the offload delete instruction based on determining that the offload request or the offload delete instruction has not been received; and
   determine that the data flow has ended based on the data flow and a beacon not being received after a particular amount of time.

10. The system of claim 9, where the first component is further to:
   determine a cumulative quantity of packets or bytes of the data flow transmitted by the first component and the second component based on determining that the data flow has ended; and
   provide information identifying the cumulative quantity of packets or bytes to a billing server to cause the billing server to assess a charge based on determining the cumulative quantity of packets or bytes.

11. The system of claim 9, where the first component, when updating the data flow information, is to:
   update statistics of the data flow based on information included in the beacon,
      the statistics identifying a cumulative quantity of packets or bytes of the data flow transmitted by the first component and the second component.

12. The system of claim 9, where the first component, when determining that the offload request has not been received by the second component, is to:
   determine that the offload request has not been received by the second component based on the beacon not including information identifying the data flow and based on the first component receiving the data flow after providing the offload request.

13. The system of claim 9, where the first component, when determining that the offload delete instruction has not been received, is to:
   determine that the offload delete instruction has not been received based on the beacon including information identifying the data flow and based on the first component not receiving the data flow after providing the offload delete instruction.

14. The system of claim 13, where the first component, when providing the offload delete instruction, is to:
   provide the offload delete instruction based on a bit rate of the data flow satisfying a particular threshold,
      the bit rate of the data flow being identified by information included in the beacon.

15. The system of claim 9, where the first component is further to:
   provide the initial group of packets towards the destination device after servicing the initial group of packets.

16. A non-transitory computer-readable medium for storing instructions, the instructions comprising:
a plurality of instructions that, when executed by a first component of a network device that is at least partially implemented in hardware, cause the first component to:
   receive initial group of packets associated with a data flow;
   perform a service on the initial group of packets;
   determine that subsequent group of packets of the data flow does not need to be serviced based on a result of performing the service on the initial group of packets;
   provide an offload request to a second component of the network device to offload the data flow from the first component,
      the first component corresponding to a service plane component and the second component corresponding to a forwarding plane component, and
      the offload request directing the second component to:
         provide the data flow towards a destination device, and
         bypass the first component;
   receive a beacon from the second component,
      the beacon including information regarding one or more offloaded data flows,
         the information regarding the one or more offloaded data flows including at least one of:
         identifiers of the one or more offloaded data flows,
         a status of the one or more offloaded data flows, or
         statistics of the one or more offloaded data flows; and update data flow information regarding the data flow, without receiving the one or more offloaded data flows, based on receiving the beacon,
the data flow information being updated with:
the information regarding the one or more offloaded data flows, and
information regarding one or more non-offloaded data flows;
provide an offload delete instruction to discontinue offloading the data flow;
determine that the offload request or the offload delete instruction has not been received by the second component;
resend the offload request or the offload delete instruction based on determining that the offload request or the offload delete instruction has not been received; and
determine that the data flow has ended based on the data flow and a beacon not being received after a particular amount of time.

17. The non-transitory computer-readable medium of claim 16, where the plurality of instructions, when executed by the first component, further cause the first component to:
determine a cumulative quantity of packets or bytes of the data flow transmitted by the first component and the second component based on determining that the data flow has ended; and
provide information identifying the cumulative quantity of packets or bytes to a billing server to cause the billing server to assess a charge based on determining the cumulative quantity of packets or bytes.

18. The non-transitory computer-readable medium of claim 16, where the plurality of instructions, that cause the first component to update the data flow information, cause the first component to:
update statistics of the one or more data flows based on information included in the beacon,
the statistics identifying a cumulative quantity of packets or bytes of the data flow transmitted by the first component and the second component.

19. The non-transitory computer-readable medium of claim 16, where the plurality of instructions, that cause the first component to determine that the offload request has not been received, cause the first component to:
determine that the offload request has not been received based on the beacon not including information identifying the data flow and based on the first component receiving the data flow after providing the offload request.

20. The non-transitory computer-readable medium of claim 16, where the plurality of instructions, that cause the first component to determine that the offload delete instruction has not been received, cause the first component to:
determine that the offload delete instruction has not been received based on the beacon including information identifying the data flow and based on the first component not receiving the data flow after providing the offload delete instruction.

* * * * *